United States Patent
Cox et al.

(10) Patent No.: US 10,400,305 B2
(45) Date of Patent: Sep. 3, 2019

(54) METHOD FOR PRODUCING TITANIUM-ALUMINUM-VANADIUM ALLOY

(71) Applicant: UNIVERSAL ACHEMETAL TITANIUM, LLC, Cherry Hill, NJ (US)

(72) Inventors: James R. Cox, Cherry Hill, NJ (US); Chanaka L. De Alwis, Cherry Hill, NJ (US); Benjamin A. Kohler, Cherry Hill, NJ (US); Michael G. Lewis, Cherry Hill, NJ (US)

(73) Assignee: UNIVERSAL ACHEMETAL TITANIUM, LLC, Cherry Hill, NJ (US)

(*) Notice: Subject to any disclaimer, the term of this patent is extended or adjusted under 35 U.S.C. 154(b) by 0 days.

(21) Appl. No.: 15/703,765

(22) Filed: Sep. 13, 2017

(65) Prior Publication Data

US 2018/0073101 A1    Mar. 15, 2018

Related U.S. Application Data (60) Provisional application No. 62/394,588, filed on Sep. 14, 2016.

(51) Int. Cl.
| | |
|---|---|
| C22B 4/02 | (2006.01) |
| C22B 5/04 | (2006.01) |
| C22C 14/00 | (2006.01) |
| C22B 34/12 | (2006.01) |
| C25C 3/26 | (2006.01) |
| C25C 3/36 | (2006.01) |

(52) U.S. Cl.
CPC .......... *C22B 4/02* (2013.01); *C22B 5/04* (2013.01); *C22B 34/1277* (2013.01); *C22C 14/00* (2013.01); *C25C 3/26* (2013.01); *C25C 3/36* (2013.01)

(58) Field of Classification Search
CPC .................. C22B 34/1263; C22B 34/1277
See application file for complete search history.

(56) References Cited

U.S. PATENT DOCUMENTS

| | | | |
|---|---|---|---|
| 910,394 A | 1/1909 | Kuhne | |
| 1,089,773 A | 3/1914 | Kraus | |

(Continued)

FOREIGN PATENT DOCUMENTS

| | | |
|---|---|---|
| AU | 2012358205 | 1/2018 |
| EP | 1541716 | 6/2005 |

(Continued)

OTHER PUBLICATIONS

Fang, Zhigang Zak. (2010). Sintering of Advanced Materials—Fundamentals and Processes—13.2.1 Methods of Production and Powder Characteristics. Woodhead Publishing (Year: 2010).*

(Continued)

*Primary Examiner* — Colleen P Dunn
*Assistant Examiner* — Jeremy C Jones
(74) *Attorney, Agent, or Firm* — Greenberg Traurig, LLP (57) ABSTRACT

A method is provided for the production of titanium-aluminum-vanadium alloy products directly from a variety of titanium and vanadium bearing ores that reduces the processing steps significantly as compared to current Ti—Al—V alloy production methods.

61 Claims, 2 Drawing Sheets

Comparison of production steps in commercial Ti-Al-V alloys and in embodiment of present invention.

(56) References Cited

U.S. PATENT DOCUMENTS

| | | | |
|---|---|---|---|
| 1,533,505 A | 4/1925 | Lubowsky | |
| 1,562,041 A | 11/1925 | Pacz | |
| 1,593,660 A | 7/1926 | Lubowsky | |
| 2,148,345 A | 2/1939 | Frendenberg | |
| 2,205,854 A | 6/1940 | Kroll | |
| 2,337,314 A | 12/1943 | Deppeler | |
| 2,395,286 A | 2/1946 | Merle | |
| 2,647,826 A | 8/1953 | Jordan | |
| 2,684,653 A | 7/1954 | Dryer | |
| 2,707,679 A | 5/1955 | Lilliendahl et al. | |
| 2,714,564 A | 8/1955 | Loonam | |
| 2,745,802 A | 5/1956 | Schmidt | |
| 2,753,254 A | 7/1956 | Rick | |
| 2,757,135 A | 7/1956 | Gleave et al. | |
| 2,766,111 A | 10/1956 | Singleton | |
| 2,777,763 A | 1/1957 | Whaley | |
| 2,780,593 A | 2/1957 | Snow et al. | |
| 2,789,896 A | 4/1957 | Coffer | |
| 2,789,943 A | 4/1957 | Kittelberger | |
| 2,817,631 A | 12/1957 | Gullett | |
| 2,823,991 A | 2/1958 | Kamlet | |
| 2,830,893 A | 4/1958 | Dean | |
| 2,833,704 A | 5/1958 | Wainer | |
| 2,838,393 A | 6/1958 | Dean | |
| 2,846,303 A | 8/1958 | Keller et al. | |
| 2,846,304 A | 8/1958 | Keller | |
| 2,848,395 A | 8/1958 | Carignan | |
| 2,857,264 A | 10/1958 | Schossberger | |
| 2,864,749 A | 12/1958 | Slatin | |
| 2,876,094 A | 3/1959 | Lusby, Jr. | |
| 2,889,218 A | 6/1959 | Hiskey et al. | |
| 2,890,112 A | 6/1959 | Winter, Jr. | |
| 2,893,935 A | 7/1959 | Johns | |
| 2,901,410 A | 8/1959 | Dean et al. | |
| 2,904,428 A | 9/1959 | Dean | |
| 2,908,619 A | 10/1959 | Barnett | |
| 2,909,473 A | 10/1959 | Dean | |
| 2,929,473 A | 10/1959 | Dean et al. | |
| 2,913,378 A | 11/1959 | Dean et al. | |
| 2,913,380 A | 11/1959 | Gullett | |
| 2,915,382 A | 12/1959 | Hellier et al. | |
| 2,915,383 A | 12/1959 | Yamartino | |
| 2,917,440 A | 12/1959 | Olson | |
| 2,921,890 A | 1/1960 | Raney | |
| 2,922,710 A | 1/1960 | Dombrowski et al. | |
| 2,944,949 A | 7/1960 | Leech | |
| 2,951,021 A | 8/1960 | Di Pietro | |
| 2,986,462 A | 5/1961 | Wright | |
| 3,036,961 A | 5/1962 | Herasymenko | |
| 3,047,477 A | 7/1962 | Spraul et al. | |
| 3,085,872 A | 4/1963 | Griffiths | |
| 3,085,873 A | 4/1963 | Griffiths | |
| 3,098,021 A | 7/1963 | Hansen | |
| 3,098,805 A | 7/1963 | Ervin, Jr. et al. | |
| 3,114,626 A | 12/1963 | Dombrowski et al. | |
| 3,137,641 A | 6/1964 | Slatin | |
| 3,386,817 A | 6/1968 | Huml | |
| 3,406,056 A | 10/1968 | Albert et al. | |
| 3,625,676 A | 12/1971 | Perfect | |
| 3,721,549 A | 3/1973 | Gallay et al. | |
| 3,736,132 A | 5/1973 | Prse et al. | |
| 3,746,535 A | 7/1973 | Brandstatter | |
| 3,794,482 A | 2/1974 | Anderson et al. | |
| 3,801,307 A | 4/1974 | Hurd | |
| 3,825,415 A | 7/1974 | Johnston et al. | |
| 3,966,455 A | 6/1976 | Taylor | |
| 3,977,866 A | 8/1976 | Othmer | |
| 4,169,722 A | 10/1979 | Fletcher | |
| 4,390,365 A | 6/1983 | Hard et al. | |
| 4,396,472 A | 8/1983 | Armand | |
| 4,401,467 A | 8/1983 | Jordan | |
| 4,468,248 A | 8/1984 | Megy | |
| 4,725,312 A | 2/1988 | Seon et al. | |
| 4,770,750 A | 9/1988 | Armand | |
| 4,793,854 A | 12/1988 | Shimotori et al. | |
| 4,820,339 A | 4/1989 | Bienvenu et al. | |
| 4,875,985 A | 10/1989 | Donahue et al. | |
| 4,923,577 A | 5/1990 | McLaughlin et al. | |
| 4,964,973 A | 10/1990 | Donahue et al. | |
| 4,985,069 A | 1/1991 | Traut | |
| 4,999,097 A | 3/1991 | Sadoway | |
| 5,071,472 A | 12/1991 | Traut et al. | |
| 5,254,232 A | 10/1993 | Sadoway | |
| 5,397,375 A | 3/1995 | O'Donnell et al. | |
| 5,404,929 A | 4/1995 | Till | |
| 5,503,655 A | 4/1996 | Joseph | |
| 5,536,448 A | 7/1996 | Takahashi et al. | |
| 6,063,254 A | 5/2000 | Rosenberg | |
| 6,074,545 A | 6/2000 | Ginatta | |
| 6,103,303 A | 8/2000 | Takahashi et al. | |
| 6,117,208 A | 9/2000 | Sharma | |
| 6,136,706 A | 10/2000 | Jabotinski et al. | |
| 6,245,211 B1 | 6/2001 | Fortin | |
| 6,309,595 B1 | 10/2001 | Rosenberg et al. | |
| 6,596,228 B2 | 7/2003 | Rosenberg et al. | |
| 6,663,763 B2 | 12/2003 | Strezov et al. | |
| 6,712,952 B1 | 3/2004 | Fray et al. | |
| 6,799,344 B2 | 10/2004 | Gladney et al. | |
| 6,958,115 B2 | 10/2005 | O'Gardy et al. | |
| 7,208,075 B2 | 4/2007 | Strezov et al. | |
| 7,381,366 B2 | 6/2008 | Carter, Jr. et al. | |
| 7,410,562 B2 | 8/2008 | Withers et al. | |
| 7,470,355 B2 | 12/2008 | Osborn et al. | |
| 7,504,017 B2 | 3/2009 | Cardarelli | |
| 7,527,669 B2 | 5/2009 | Morrell et al. | |
| 7,624,464 B2 | 12/2009 | Gladney et al. | |
| 7,794,580 B2 | 9/2010 | Withers et al. | |
| 7,901,561 B2 | 3/2011 | Johansen et al. | |
| 7,985,326 B2 | 7/2011 | Withers et al. | |
| 8,127,383 B2 | 3/2012 | Gladney et al. | |
| 8,562,715 B2 | 10/2013 | Gries | |
| 9,816,192 B2 | 11/2017 | Cox et al. | |
| 2004/0068800 A1 | 4/2004 | Gladney et al. | |
| 2004/0159559 A1 | 8/2004 | Fray et al. | |
| 2005/0108826 A1 | 5/2005 | Gladney et al. | |
| 2005/0166706 A1 | 8/2005 | Withers et al. | |
| 2005/0279187 A1 | 12/2005 | Shekhter | |
| 2006/0049060 A1 | 3/2006 | Hori | |
| 2006/0236811 A1 | 10/2006 | Withers et al. | |
| 2006/0237327 A1 | 10/2006 | Withers et al. | |
| 2007/0029208 A1 | 2/2007 | Withers et al. | |
| 2007/0181435 A1 | 8/2007 | Ogasawara et al. | |
| 2007/0251833 A1 | 11/2007 | Ratchev et al. | |
| 2008/0149495 A1 | 6/2008 | Mukunthan et al. | |
| 2008/0187455 A1 | 8/2008 | Armstrong et al. | |
| 2008/0190778 A1 | 8/2008 | Withers et al. | |
| 2010/0132123 A1 | 6/2010 | Gladney et al. | |
| 2010/0237280 A1 | 9/2010 | Barnes | |
| 2010/0243468 A1 | 9/2010 | Mu et al. | |
| 2011/0097501 A1 | 4/2011 | Hollins et al. | |
| 2012/0152756 A1 | 6/2012 | Fray et al. | |
| 2013/0019717 A1 | 1/2013 | Haidar | |
| 2013/0164167 A1 | 6/2013 | Cox | |
| 2018/0094357 A1 | 4/2018 | Cox | |

FOREIGN PATENT DOCUMENTS

| | | |
|---|---|---|
| EP | 2794943 | 10/2014 |
| GB | 2158102 | 8/1988 |
| GB | 2472496 | 8/2010 |
| JP | 4813205 | 2/1973 |
| JP | 60238430 | 11/1985 |
| JP | 7165000423 | 6/1995 |
| JP | 8225980 | 9/1996 |
| JP | 201192748 | 7/2001 |
| JP | 2003524073 | 8/2003 |
| JP | 2003306725 | 10/2003 |
| JP | 2005194554 | 7/2005 |
| JP | 2009518544 | 5/2009 |
| JP | 201379446 | 5/2013 |
| JP | 6228550 | 10/2017 |
| JP | 2018-048402 | 3/2018 |
| JP | 6424265 | 10/2018 |
| RU | 2338805 | 5/2008 |

(56) References Cited

FOREIGN PATENT DOCUMENTS

| | | |
|---|---|---|
| RU | 2485194 | 6/2013 |
| TW | 200523402 | 7/2005 |
| TW | 1564397 | 1/2017 |
| WO | 98/49370 | 11/1998 |
| WO | 2001/62996 | 8/2001 |
| WO | 2003/046258 | 6/2003 |
| WO | 2007/097823 | 8/2007 |
| WO | 2008/016526 | 2/2008 |
| WO | 2008/091806 | 7/2008 |
| WO | 2011/015845 | 2/2011 |
| WO | 2013/096893 | 6/2013 |
| WO | 2018/186922 | 10/2018 |
| ZA | 2014/04758 | 8/2016 |

OTHER PUBLICATIONS

Paul C. Turner et al., Low Cost Titanium—Myth or Reality, www.osti.gov/scitech/servlets/purt/899609; 26 pages.

David S. Van Vuuren, Direct titanium powder production by metallothermic processes, Titanium Power Metallurgy, 2015, Elsevier Inc.

D.S. & Van Vurren, A critical evaluation of processes to produce primary titanium, The Journal of the Southern Africa Institute of Mining and Metallurgy, Aug. 2009, vol. 109.

Zdunczyk, Mark J. et al.; 22. Quartz/Silica Sand; 1990; pp. 235-236; Society for Mining, Metallurgy, and Exploration (SME).

Goldman, Harold B.; 23. Sand and Gravel; 1990; pp. 237-241; Society for Mining, Metallurgy, and Exploration (SME).

Olsen, Richard H.; 24. Talc; 1990; pp. 242-245; Society for Mining, Metallurgy, and Exploration (SME).

25. Titanium; 1990; pp. 246-254; Society for Mining, Metallurgy, and Exploration (SME).

Freitas, Lino, R. et al.; "Aluminothermic Reduction of Anatase Concentrates;" INFACON 86 Proceedings (1986): 349-62, INFACON; International Ferro-Alloys Congress. Web. Nov. 3, 2015.

EPO, Supplementary European Search Report, EP 12859572, dated May 19, 2015; 2 pages; Europe.

EPO, Translation of RU2338805; May 10, 2008; 5 pages; Europe.

EPO, Translation of JP8225980; Aug. 3, 1996; 14 pages; Japan Energy Corp.

Korean Patent Office; PCT International Search Report, Issued in Connection to PCT/US2012/071467; dated Apr. 25, 2013; 4 pages; Korea.

Korean Patent Office; PCT Written Opinion of the International Searching Authority, Issued in Connection to PCT/US2012/071467; dated Apr. 25, 2013; 8 pages; Korea.

Giles, George; Crucible Furnaces; Morgan Molten Metal Systems; pp. 155-159; ASM International Handbook Committee. (2008; 2010). ASM Handbook, vol. 15—Castin—19.2 Furnace Types. ASM International.

Goa, Zhijiang et al.; Study on Preparing Ti6A14V Alloys From V—Ti Bearing Beach Placers; Energy Technology 2016: Carbon Dioxide Management and Other Technologies; 2016; pp. 117-124; China.

Achimovicova, M. et al.; Aluminothermic Production of Titanium Alloys (Part 1): Synthesis of TIO2 as Input Material; Association of Metallurgical Engineers of Serbia; Metall. Mater. Eng. vol. 20 (2); 2014; pp. 141-154; Germany.

Dyas, Keith E.; Chapter 9: Quality and Specifications of Products; Society for Mining, Metallurgy, and Expoloration; 2002; pp. 174-193.

Kennedym, B.A.; Surface Mining, 2nd Edition—2.10.25.2 Distribution of Deposits; pp. 248-251; Society for Mining, Metallurgy, and Exploration (SME); 1990.

Lowrie, Lowrie, Raymond L.; SME Mining Reference Handbook—9.34 Tin; Society for Mining, Metallurgy, and Exploration (SME); 2002.

Zhang,Wensheng et al.; A Literature Review of Titanium Metallurgical Processes; 2011; 12 pages; Elsevier B.V.

Wang, L.L. et al.; Review, Thermite Reactions: Their Utilization in the Synthesis and Processing of Materials; 1993; pp. 3693-3708; Journal of Materials Science 28.; Chapman & Hall.

Imam, Ashraf M. et al.; Titanium Processing, Overview: Low Cost Titanium and Developing Applications; pp. 17-18; www.tms.org/jom.html.

Zheng, Haiyan et al.; Production of Titanium Powder Directly from Titanium Ore; 4 pages; Japan.

Zheng, Haiyan et al.; Production of Titanium Powder by the Calciothermic Reduction of Titanium Concentrates or Ore Using the Perform Reduction Process; Viewed 5/09/208; http://cat.inist.fr/?aModele=afficheN&cpsidt=19035891.

European Patent Office; Communication Pursuant to Article 94(3) EPC, Issued in connection to EP12859572.5; 4 pages; dated Oct. 19, 2017; Europe.

European Patent Office; PCT International Search Report, issued in connection to PCT/US2017/051399; dated May 25, 2018; 5 pages; Europe.

European Patent Office; PCT Written Opinion of the International Searching Authority, issued in connection to PCT/US2017/051399; dated May 25, 2018; 7 pages; Europe.

European Patent Office; PCT International Search Report, issued in connection to PCT/US2018/013813; dated Nov. 13, 2018; 4 pages; Europe.

European Patent Office; PCT Written Opinion of the International Searching Authority, issued in connection to PCT/US2018/013813; dated Nov. 13, 2018; 7 pages; Europe.

Australian Government; Examination Report No. 1 for Standard Patent Application, Issued in connection to AU2017279628; dated Oct. 23, 2018; 2 pages; Australia.

\* cited by examiner

FIG. 1

Comparison of production steps in commercial Ti-Al-V alloys and in embodiment of present invention.

FIG. 2

Scanning Electron Microscope (SEM) image of refined Ti-Al-V alloy wool in embodiment of present invention.

METHOD FOR PRODUCING TITANIUM-ALUMINUM-VANADIUM ALLOY

RELATED APPLICATIONS

This application claims the benefit, and priority benefit, of U.S. application Ser. No. 62/394,588, filed Sep. 14, 2016, the disclosure and contents of which are incorporated by reference herein in their entirety.

BACKGROUND OF THE DISCLOSURE

1. Field of the Invention

The present invention relates to a method for producing metal alloys, and more particularly, to a method for producing titanium alloys such as Ti-6Al-4V ("Ti64"), a titanium-aluminum-vanadium (Ti—Al—V) alloy.

2. Description of the Related Art

Superior structural properties such as corrosion resistance, light weight and high-melting point make titanium and its alloys the material of choice for many engineering applications. The alloy Ti-6Al-4V (Ti64) is the most commonly used titanium alloy and is known as the "workhorse" of the titanium alloys. As of today, 50% of all titanium metal is used as Ti64 titanium alloy that is produced from titanium sponge. Ti64 is significantly stronger than unalloyed titanium and—in contrast to commercially pure titanium—may be heat treated to increase its strength which makes Ti64 an excellent combination of high strength, light weight, high corrosion resistance and good formability.

However, the use of titanium and its alloys is limited due to the high cost associated with their production. For example, to produce a Ti—Al—V alloy according to currently known methods, titanium sponge must first be produced by using a process known as the "Kroll process", and then aluminum and vanadium must be added by using various melting processes. In some instances, hydraulic presses are used to form alloy compacts, which are in turn welded together to form electrodes which are melted several times in a vacuum arc remelt furnace to obtain a good quality alloy. Therefore, the cost of titanium alloys is several times higher than the original cost of titanium. Titanium alloy powder production requires further processing steps and requires alloyed titanium as the starting feedstock. Therefore, the powder cost will be 15-30 times higher than the original titanium.

Despite the cost of production, titanium alloys are the only choice of many engineering applications. Accordingly, there is a need for a new titanium alloy production process that reduces the cost significantly.

Attempts have been made to produce Ti-6Al-4V alloy directly without using titanium sponge. For example, a research paper by Gao et. al. (Study on preparing Ti6Al4V alloy from V—Ti bearing beachplacers, Energy Technology: Carbon Dioxide Management and Other Technologies, Edited by L. Li, D. P. Guillen, N. R. Neelameggham, L. Zhang, J. Zhu, X. Liu, S. N. Basu, N. Hague, T. Wang, D. E. Verhulst and A. Pandey, TMS, 2016) describes the production of Ti-6Al-4V by using traditional aluminothermic reduction with accelerants. However, a Ti64 product was never realized. Additionally, the use of booster/accelerants and additional heat generating components adds an extra cost to the process, and these materials are unsafe to handle.

US 2008/0187455A1 (Armstrong et. al), U.S. Pat. No. 8,562,715B2 (Haidar) and a research paper by J. C. Withers (Production of titanium powder by an electrolytic method and compaction of the powder, Titanium Powder Metallurgy, Science, Technology and Applications, Edited by M. Quian and F. H. Froes, Elsevier, 2015) each describe different methods of direct production of Ti-6Al-4V using a mixture of chlorides of titanium, vanadium and aluminum as precursor materials. None of these references describe the direct use of titanium and vanadium oxide bearing ores for purposes of Ti-6Al-4V production.

In general, existing literature teaches away from using aluminothermic and electrochemical methods to produce Ti—Al—V alloys directly. Moreover, fundamental thermodynamic and electrochemical theory teaches away from using these methods. It is believed that no commercial process to directly produce Ti—Al—V alloys without post-process melting/alloying currently exists.

SUMMARY OF THE DISCLOSURE

The present invention provides a method for the production of titanium-aluminum-vanadium alloys directly, without the need to use previously produced titanium metal as a starting material. Therefore, the number of processing steps and the cost associated with each processing step are significantly reduced.

In an embodiment, one can produce a desired alloy by including the desired alloying metal ore in the feedstock in at least the stoichiometric quantity necessary in relation to the titanium, vanadium and aluminum present. For some compositions, adjustments to the ratio of alloying metal ores in the feedstock will be necessary to optimize yield as certain metals influence the reaction output differently than others. Empirical analysis of yields will allow slight variations to account for metal combinations not specifically described in the examples.

The present invention also provides a method for the production of titanium-aluminum-vanadium alloy products directly from a variety of titanium and vanadium bearing ores that reduces the number of processing steps significantly as compared to current Ti—Al—V alloy production methods.

Additional aspects and advantages of the present invention will be set forth in part in the description which follows and, in part, will be obvious from the description, or may be learned by practice of the invention.

The present invention may be achieved by providing a method that includes heating a chemical blend, and the chemical blend includes a mixture of a titanium-bearing ore and a vanadium-bearing ore, an Al reducing agent configured to reduce the titanium and vanadium bearing ore mixture to a crude titanium-aluminum-vanadium alloy product, and a viscosity agent; initiating, sustaining and controlling an extraction reaction in the chemical blend to form a crude titanium-aluminum-vanadium alloy product and the extracted product includes at least 3.0 wt % oxygen, and a residual slag; and separating the residual slag from the crude titanium-aluminum-vanadium alloy product, and via the chemical blend ratio, the viscosity agent adjusts the slag viscosity to allow for efficient separation of the crude titanium-aluminum-vanadium alloy product from the residual slag into two layers during the reaction; configuring the crude titanium-aluminum-vanadium alloy product from the extraction reaction as an anode in an electrolytic cell, and the electrolytic cell is configured with an electrolyte; heating the electrolyte to a temperature between 600° C. and 900° C. to provide a molten electrolyte, and the molten electrolyte is retained in a reaction vessel and is in contact with the anode and a cathode; directing a current from the anode, through the molten electrolyte bath to the cathode; depositing a refined titanium-aluminum-vanadium alloy product on the cathode; and recovering the refined titanium-aluminum-vanadium alloy product from the reaction vessel, and the refined titanium-aluminum-vanadium alloy product includes at least 85 wt. % titanium and 5.0 wt. % aluminum and 3.0 wt. % vanadium.

In another embodiment, the viscosity agent is $CaF_2$, the titanium-bearing ore includes titanium oxide ($TiO_2$) and the vanadium bearing ore includes vanadium oxide ($V_2O_5$), and, according to the generalized chemical equation below, the molar ratio of the titanium oxide and vanadium oxide components in the ore mixture to the reducing agent to viscosity agent corresponds to a ratio of 3 moles of the titanium oxide and 0.12 to 0.24 moles of the vanadium oxide components in the ore mixture, from 0.6 to 0.7 of the Al reducing agent, and from 1.0 to 1.6 of the $CaF_2$ viscosity agent.

In another embodiment, the chemical blend includes a ratio of the titanium and vanadium bearing ore mixture to the reducing agent that corresponds to a weight ratio of titanium oxide and vanadium oxide components in the ore mixture to reducing metal in the reducing agent of 1.7 to 2.3.

In another embodiment, the heating step further includes heating the chemical blend at a ramp up rate between 1° C. to 125° C./min.

In another embodiment, the heating step further includes heating the chemical blend to a temperature between 1500-1800° C.

In another embodiment, the heating step further includes externally heating the chemical blend to maintain the chemical blend at a reaction temperature between 1600-1800° C. for a time period between 5 and 30 minutes.

In another embodiment, the thermal extraction process further includes, after the reacting step, cooling the crude titanium-aluminum-vanadium product and residual slag to a temperature between 1500° C. and 1600° C.

In another embodiment, the titanium-bearing ore includes titanium oxide, the vanadium-bearing ore includes vanadium oxide, the reducing agent includes aluminum, and the viscosity agent includes calcium fluoride, and the ratio of titanium-bearing ore to vanadium-bearing ore to reducing agent to viscosity agent corresponds to the following equation:

Where: $0.04<x<0.08$ and $0.3<y<1.2$ and $2.0<z<3.0$.

In another embodiment, $0.05<x<0.07$ and $0.4<y<1.1$.

In another embodiment, $x=0.06$ and $y=0.9$.

In another embodiment, the titanium-vanadium bearing ore mixture includes titanium oxide ($TiO_2$) and vanadium oxide ($V_2O_5$), and the weight ratio of the titanium oxide to the vanadium oxide component in the ore mixture corresponds to a ratio of 5.5 to 11.

In another embodiment, the blend further includes a viscosity agent, and the viscosity agent includes calcium fluoride ($CaF_2$), and the ratio of the titanium and vanadium bearing ore mixture to the viscosity agent $CaF_2$ that corresponds to a weight ratio of titanium oxide and vanadium oxide components in the ore mixture to viscosity agent $CaF_2$ is 1.1 to 1.8.

In another embodiment, the thermally extracted crude titanium-aluminum-vanadium-oxygen alloy product includes at least 66.0% titanium, 11.0% aluminum, 6.0% vanadium and 3.0% oxygen by weight.

In another embodiment, the thermally extracted crude titanium-aluminum-vanadium product yield is between 85.0%-95.0%

In another embodiment, the refined titanium-aluminum-vanadium metal alloy product is fibrous.

In another embodiment, the refined titanium-aluminum-vanadium metal alloy product has a wool-like morphology.

In another embodiment, the method further includes compacting a refined titanium-aluminum-vanadium metal alloy product into a near net shaped green compact without a binding agent.

In another embodiment, the refined titanium product includes titanium-aluminum-vanadium metal alloy wool.

In another embodiment, the refined titanium-aluminum-vanadium alloy product includes at least 88.0% titanium, 5.0% aluminum, and 3.0 wt. % vanadium by weight.

In another embodiment, the method further includes grinding and/or spheroidizing a refined titanium-aluminum-vanadium metal alloy product into a powder.

In another embodiment, the metal alloy powder includes at least 90 wt % titanium and 5.5 wt % aluminum and 3.5 wt % vanadium.

In another embodiment, the titanium-vanadium bearing ore mixture has a particle size between 50 microns and 200 microns.

In another embodiment, the titanium-vanadium bearing ore mixture has a particle size less than 80 microns.

In another embodiment, a vanadium-bearing ore may or may not be excluded from the chemical blend and appropriate quantities of aluminum, iron, chromium, copper, manganese, silicon, zirconium, molybdenum, silver, vanadium, nickel, cobalt, tin, rare-earth or other ores may be used to produce alloys of desired composition.

In another embodiment, the electrical differential is between 0.5 volts and 2.5 volts.

In another embodiment, the current density is between 0.01 $A/cm^2$ and 1.0 $A/cm^2$.

In another embodiment, the heating step further includes heating the chemical blend at a ramp up rate between 1° C. to 10° C./min.

In another embodiment, the electrolyte consists essentially of halide salts of alkali metals; halide salts of alkali earth metals; or a combination of halide salts of alkali metals and halide salts of alkali earth metals.

The present invention may also be achieved by providing a method including heating a chemical blend to a temperature of between 1500° C.-1800° C. and the chemical blend includes a mixture of titanium-bearing ore comprising titanium oxide ($TiO_2$) and vanadium bearing ore comprising vanadium oxide ($V_2O_5$); an Al reducing agent, configured to reduce the titanium and vanadium bearing ore mixture to a crude titanium-aluminum-vanadium product; and a $CaF_2$ viscosity agent; and according to the generalized chemical equation herein, the molar ratio of the titanium oxide and vanadium oxide components in the ore mixture to the reducing agent to viscosity agent corresponds to a ratio of 3 moles of the titanium oxide and 0.12 to 0.24 moles of the vanadium oxide components in the ore mixture, from 0.6 to 0.7 of the Al reducing agent, and from 1.0 to 1.6 of the $CaF_2$ viscosity agent; initiating an extraction reaction in the chemical blend to form a crude titanium-aluminum-vanadium product and the extracted product includes at least 66.0 wt. % titanium, 11.0 wt. % aluminum, 6.0 wt % vanadium and 3.0 wt % oxygen, and a residual slag; and separating the residual slag from the crude titanium-aluminum-vanadium product, and via the chemical blend ratio, the $CaF_2$ viscosity agent adjusts the slag viscosity to allow for efficient separation of the titanium product from the residual slag into two layers during the reaction; configuring the titanium product from the extraction reaction as an anode in an electrolytic cell, and the electrolytic cell is configured with an electrolyte; heating the electrolyte consisting of halide salts of alkali metals, halide salts of alkali earth metals, and combinations thereof, to a temperature between 600° C. and 900° C. to provide a molten electrolyte, and the molten electrolyte is retained in a reaction vessel and is in contact with the anode and a cathode; directing a current from the anode, through the molten electrolyte bath to the cathode, depositing a refined titanium-aluminum-vanadium alloy on the cathode, and recovering the refined titanium-aluminum-vanadium alloy product from the reaction vessel, and the refined titanium-aluminum-vanadium alloy includes at least 85.0 wt. % titanium, 5.0 wt % aluminum and 3.0 wt % vanadium.

In another embodiment, the method can further include initiating, sustaining and controlling the extraction reaction in the chemical blend.

In another embodiment, the chemical blend includes a ratio of the titanium and vanadium bearing ore mixture to the reducing agent that corresponds to a weight ratio of titanium oxide and vanadium oxide components in the ore mixture to reducing metal in the reducing agent of 1.8 to 2.2.

In another embodiment, the chemical blend includes a ratio of the titanium and vanadium bearing ore mixture to the reducing agent that corresponds to a weight ratio of titanium oxide and vanadium oxide components in the ore mixture to reducing metal in the reducing agent of 2.0 to 2.3.

In another embodiment, the heating step further includes heating the chemical blend at a ramp up rate between 1° C. to 25° C./minute.

In another embodiment, the heating step further includes heating the chemical blend at a ramp up rate between 26° C. to 50° C./minute.

In another embodiment, the heating step further includes heating the chemical blend at a ramp up rate between 51° C. to 100° C./minute.

In another embodiment, the heating step further includes heating the chemical blend at a ramp up rate between 101° C. to 125° C./minute.

In another embodiment, the heating step further includes externally heating the chemical blend to maintain the chemical blend at a reaction temperature between 1600-1800° C. for a time period between 10 and 20 minutes.

In another embodiment, the heating step further includes externally heating the chemical blend to maintain the chemical blend at a reaction temperature between 1600-1800° C. for a time period between 21 and 30 minutes.

In another embodiment, the thermal extraction process further includes, after the reacting step, cooling the crude titanium-aluminum-vanadium product and residual slag to a temperature between 1500° C. and 1600° C.

In another embodiment, the titanium-vanadium bearing ore mixture includes titanium oxide ($TiO_2$) and vanadium oxide ($V_2O_5$), and the weight ratio of the titanium oxide to the vanadium oxide component in the ore mixture corresponds to a ratio of 6.0 to 10.

In another embodiment, the blend further includes a viscosity agent, and the viscosity agent includes calcium fluoride ($CaF_2$), and the ratio of the titanium and vanadium bearing ore mixture to the viscosity agent $CaF_2$ that corresponds to a weight ratio of titanium oxide and vanadium oxide components in the ore mixture to viscosity agent $CaF_2$ is 1.2 to 1.6.

In another embodiment, the thermally extracted crude titanium-aluminum-vanadium product includes between 66-76% titanium, 11-21% aluminum, 6-10% vanadium and 3-7% oxygen.

In another embodiment, the thermally extracted crude titanium-aluminum-vanadium product yield is between 85.0%-95.0%

In another embodiment, the refined titanium-aluminum-vanadium metal alloy product is fibrous.

In another embodiment, the refined titanium-aluminum-vanadium metal alloy product has a wool-like morphology.

In another embodiment, the method further includes compacting a refined titanium-aluminum-vanadium metal alloy product into a near net shaped green compact without a binding agent.

In another embodiment, the refined titanium product includes titanium-aluminum-vanadium metal alloy wool.

In another embodiment, the refined titanium-aluminum-vanadium alloy product includes 88-92 wt. % titanium, 5.0-7.0 wt. % aluminum, and 3-5 wt. % vanadium.

In another embodiment, the method further includes grinding a refined titanium-aluminum-vanadium metal alloy product into a powder.

In another embodiment, the method further includes grinding and/or spheroidizing a refined titanium-aluminum-vanadium metal alloy product into a powder.

In another embodiment, the metal alloy powder includes at least 88.0 wt. % titanium and 5.0 wt % aluminum and 3.0 wt % vanadium.

In another embodiment, the titanium-vanadium bearing ore mixture has a particle size between 81 microns and 100 microns.

In another embodiment, the titanium-vanadium bearing ore mixture has a particle size between 101 microns and 200 microns.

In another embodiment, the titanium-vanadium bearing ore mixture has a particle size less than 80 microns.

In another embodiment, a vanadium-bearing ore may or may not be excluded from the chemical blend and appropriate quantities of aluminum, iron, chromium, copper, manganese, silicon, zirconium, molybdenum, silver, vanadium, nickel, cobalt, tin, rare-earth or other ores are used to produce alloys of desired composition.

In another embodiment, the titanium-vanadium bearing ore mixture includes between 75-95% by weight oxide components.

In another embodiment, the titanium-vanadium bearing ore mixture includes between 95-99% by weight oxide components.

In another embodiment, the electrical differential is between 0.7 volts and 1.4 volts.

In another embodiment, the electrical differential is between 1.5 volts and 2.0 volts.

In another embodiment, the electrical differential is between 2.1 volts and 3.0 volts.

In another embodiment, the current density is between 0.01 $A/cm^2$ and 0.06 $A/cm^2$.

In another embodiment, the current density is between 0.07 $A/cm^2$ and 1.0 $A/cm^2$.

The present invention may also be achieved by providing a method including applying a thermal extraction process to a blend of titanium-bearing ore and vanadium-bearing ore, and the thermal extraction process includes heating a chemical blend to initiate an extraction reaction, and the chemical blend includes: a titanium-bearing ore, a vanadium bearing ore, and a reducing agent; reacting the chemical blend to form a crude titanium-aluminum-vanadium product, and a residual slag, and via the viscosity agent, the crude titanium-aluminum-vanadium product is separated from the residual slag into two layers; refining the crude titanium-aluminum-vanadium product obtained from the thermal extraction process in an electrochemical separation process, and the electrochemical separation process includes heating an electrolyte consisting essentially of halide salts of alkali metals, halide salts of alkali earth metals, or combinations thereof, to a temperature between 600° C. and 900° C. to provide a molten electrolyte, and the electrolyte is retained in a reaction vessel; applying an electrical differential between an anode and a cathode to deposit titanium on the cathode, and the anode and cathode are configured in the reaction vessel in contact with the electrolyte; and recovering a refined titanium-aluminum-vanadium product from the reaction vessel, and the refined titanium-aluminum-vanadium product includes at least 85 wt. % titanium and 5 wt % aluminum and 3 wt % vanadium, further and the refined titanium product is configured as a fibrous, wool-like morphology; and pressing the refined titanium product in a mold to form a near-net shaped titanium part.

In another embodiment, the present invention may be utilized to heat a chemical blend to initiate, sustain and control an extraction reaction.

In another embodiment, the present invention may be achieved by conducting a thermal reaction to extract a crude titanium-aluminum-vanadium product containing oxygen from a mixture of titanium and vanadium-bearing ores, and refining the product obtained from the thermal extraction process in an electrochemical separation process to produce a Ti—Al—V alloy.

In another embodiment, the thermal extraction process can include mixing a chemical blend comprising a titanium-bearing ore, a vanadium bearing ore, a reducing agent, and a viscosity agent wherein a ratio of the titanium and vanadium bearing ores to the reducing agent corresponds to a weight ratio of titanium oxide and vanadium oxide components in the ore mixture to the reducing metal in the reducing agent is 1.7 to 2.1; heating the chemical blend to initiate, sustain and control an extraction reaction, wherein the chemical blend is heated at a ramp up rate between 5° C. to 15° C./min; maintaining the chemical blend at a reaction temperature between 1500-1800° C. for a time period between 5 and 30 minutes; cooling the chemical blend to a temperature between 1500° C. and 1600° C., then cooling to room temperature; and separating a titanium product from a residual slag.

In another embodiment, the refining process includes placing thermally extracted product in an anode compartment, heating an electrolyte to temperature between 600° C. and 900° C., applying a potential difference of 0.5V-2.0V between the electrodes and recovering the titanium-aluminum-vanadium alloy.

In another embodiment, the mixture of titanium and vanadium bearing ore can include (by weight) between 25% and 95% titanium oxide ($TiO_2$) and vanadium oxide ($V_2O_5$), wherein weight ratio of $TiO_2$ to $V_2O_5$ is 8.0 to 11.

In another embodiment, the elemental composition of the crude, extracted metal is of fundamental importance to the present invention. This material is used as feedstock for the refining portion of the process and will determine the chemical makeup of the final alloy product.

In another embodiment, in order to produce a Ti64 alloy, the thermally extracted crude titanium-aluminum-vanadium product includes between 66-76% titanium, 11-21% Al, 6-10% V and 3-7% O.

In another embodiment, the refined titanium-aluminum-vanadium alloy includes between 88-92% titanium, 5-7% Al and 3-5% V.

DETAILED DESCRIPTION OF THE PREFERRED EMBODIMENT

Reference will now be made in detail to the various embodiments of the present invention. The embodiments are described below to provide a more complete understanding of the components, processes and apparatuses of the present invention. Any examples given are intended to be illustrative, and not restrictive. Throughout the specification and claims, the following terms take the meanings explicitly associated herein, unless the context clearly dictates otherwise. The phrases "in some embodiments" and "in an embodiment" as used herein do not necessarily refer to the same embodiment(s), though they may. Furthermore, the phrases "in another embodiment" and "in some other embodiments" as used herein do not necessarily refer to a different embodiment, although they may. As described below, various embodiments of the present invention may be readily combined, without departing from the scope or spirit of the present invention.

As used herein, the term "or" is an inclusive operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

Figure 1:
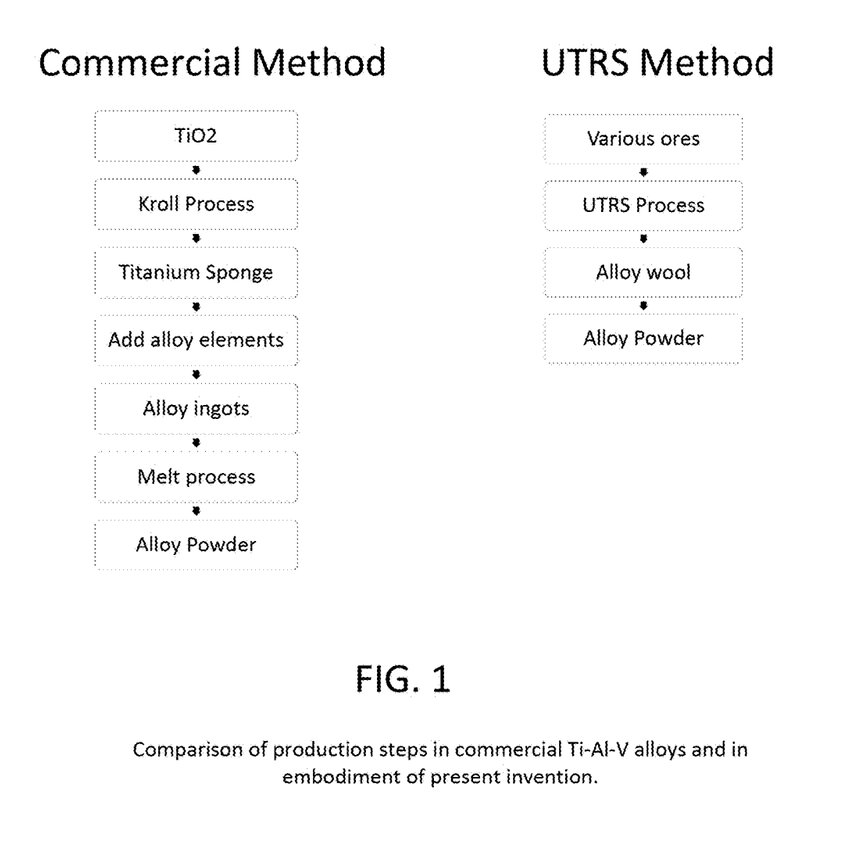
FIG. 1 illustrates a comparison of production steps for commercial Ti—Al—V alloys and for an embodiment of the present invention.

The present invention provides methods for extracting a titanium-aluminum-vanadium alloy metal product directly from titanium and vanadium bearing ores. Titanium-vanadium-aluminum alloys such as Ti-6Al-4V alloy can be produced in a more economical and efficient way than existing commercial methods. Titanium-aluminum-vanadium alloys can be produced directly, without the need to use previously produced titanium metal as a starting material. Therefore, the number of processing steps and the cost associated with each processing step are significantly reduced (see FIG. 1). Further, titanium-vanadium-aluminum alloys can be produced in an environmental benign way without producing carbon dioxide gas ($CO_2$) or other "greenhouse" gases and without using hazardous or dangerous chemicals such as chlorides of titanium or vanadium and perchlorates or permanganates.

In one embodiment, the present invention provides methods for the production of metal alloy products that include the use of metal-bearing ores, extraction of metal products from the metal-bearing ores, and refining of the extracted metal products into refined metal alloy products.

For example, in some embodiments, the present invention provides methods for the production of titanium alloy products from a mixture of titanium and other metal bearing ores. However, the present invention is not limited thereto, and other embodiments of the present invention may be used for the production of other metal alloy products, such as, but not limited to, any combination of aluminum, iron, chromium, copper, manganese, silicon, zirconium, molybdenum, silver, vanadium, nickel, cobalt, tin, and rare-earth metals.

One embodiment of the present invention provides a method for the production of titanium alloy products, particularly titanium-aluminum-vanadium (Ti—Al—V) from a mixture of titanium and vanadium bearing ores. A method for the production of titanium-aluminum-vanadium alloy products may include preparation of the titanium and vanadium bearing ores, extracting the crude titanium-aluminum-vanadium product from the mixture of titanium and vanadium bearing ores, and refining the extracted crude titanium-aluminum-vanadium product. In other embodiments, the method may include conversion of refined Ti—Al—V alloy products into final titanium-aluminum-vanadium alloy powder or ingot products.

Unlike conventional processes, the present invention provides an economical and environmentally safe method of producing titanium-aluminum-vanadium alloy products directly from a wide variety of mixtures of titanium and vanadium bearing ores. While conventional methods of alloying require previously generated titanium metal to produce titanium-aluminum-vanadium or other titanium alloys, the present invention may use a mixture of titanium and vanadium bearing ores or a mixture of titanium and other metal bearing ores. For example, in conventional methods of producing Ti—Al—V alloy, Ti metal produced by a method known as the "Kroll Process" is required and then alloying elements Al and V are added. In contrast, the present invention can use mixtures of titanium and vanadium bearing ores and the reducing agent aluminum to produce Ti—Al—V alloy. The present invention can be used with titanium- and vanadium-bearing ore concentrates, or mixtures thereof, where $TiO_2$ and $V_2O_5$ are from 95 to 99% within. However, these types of high purity ores are typically prohibitively expensive. Additionally, the present invention can be used with titanium bearing ores, or mixtures of titanium-bearing ores, having a $TiO_2$ concentration of less than 95%. In another example, the present invention can be used with titanium-bearing ores, or mixtures of titanium-bearing ores, having a $TiO_2$ concentration of less than 90%. In another example, the present invention can be used with titanium-bearing ores, or mixtures of titanium-bearing ores, having a $TiO_2$ concentration of less than 85%. In another example, the present invention can be used with titanium-bearing ores, or mixtures of titanium-bearing ores, having a $TiO_2$ concentration of less than 80%. In another example, the present invention can be used with titanium-bearing ores, or mixtures of titanium-bearing ores, having a $TiO_2$ concentration of less than 75%. In another example, the present invention can be used with titanium-bearing ores, or mixtures of titanium-bearing ores, having a $TiO_2$ concentration of less than 70%. In another example, the present invention can be used with titanium-bearing ores, or mixtures of titanium-bearing ores, having a $TiO_2$ concentration between 25% and 95%. In yet another example, the present invention can be used with titanium-bearing ores, or mixtures of titanium-bearing ores, having a $TiO_2$ concentration of at least 35%. The present invention can be used with vanadium bearing ores, or mixtures of vanadium-bearing ores, having a $V_2O_5$ concentration of less than 95%. In another example, the present invention can be used with vanadium-bearing ores, or mixtures of vanadium-bearing ores, having a $V_2O_5$ concentration of less than 90%. In another example, the present invention can be used with vanadium-bearing ores, or mixtures of vanadium-bearing ores, having a $V_2O_5$ concentration of less than 85%. In another example, the present invention can be used with titanium-bearing ores, or mixtures of titanium-bearing ores, having a $TiO_2$ concentration of less than 80%. In another example, the present invention can be used with titanium-bearing ores, or mixtures of titanium-bearing ores, having a $TiO_2$ concentration of less than 75%. In other embodiments, the present invention can use a mixture of titanium and vanadium bearing ores having between 25% and 95% titanium oxide ($TiO_2$) and vanadium oxide ($V_2O_5$), up to 30% calcium (Ca), up to 20% magnesium (Mg), up to 20% manganese (Mn), and at least 5% by weight iron (Fe). In another embodiment, the present invention can use a mixture of titanium and vanadium bearing ores having more than 50% titanium oxide ($TiO_2$) and vanadium oxide ($V_2O_5$), more than 5% calcium (Ca), more than 5% magnesium (Mg), more than 5% manganese (Mn), and more than 5% by weight iron (Fe).

It will be obvious to one skilled in the art that ores containing undesirable components that can be reduced with aluminum (e.g., iron oxide) will require larger quantities of ore and higher amounts of aluminum to extract a given amount of titanium and vanadium.

In one embodiment of the invention, the method for the extraction of crude titanium-aluminum-vanadium products from a mixture of titanium and vanadium bearing ores and the refining of the extracted crude titanium-aluminum-vanadium products may include preparing the titanium and/or vanadium bearing ores for extraction. Titanium and/or vanadium bearing ores are typically laden with impurities and agglomerated as taken from the earth. Accordingly, the raw titanium and/or vanadium-bearing ore may be subject to cleaning or concentration processes during operation to remove gangue minerals and to create titanium and/or vanadium bearing ore concentrates before extracting the crude titanium-aluminum-vanadium product therefrom in accordance with the present invention. For example, the raw titanium and/or vanadium bearing ore may be subject to a physical concentration method, such as crushing, separation of heavier and lighter particles, and may be subject to removal of gangue minerals by spiral concentration to produce a titanium and/or vanadium-bearing ore concentrate. In one embodiment, the titanium and/or vanadium-bearing ores or titanium and/or vanadium-bearing ore concentrates are ground to a nominal particle size range of between 50 to 200 micron diameter. In another embodiment, the titanium and/or vanadium-bearing ore concentrates are processed to have a particle size range of up to 1000 micron diameter in operation.

In an embodiment of the present invention, a crude titanium-aluminum-vanadium product is extracted from the mixture of titanium-bearing ore and vanadium-bearing ore. The titanium-bearing ore and/or vanadium bearing ore may be prepared beforehand into a titanium-bearing ore and/or vanadium bearing ore concentrate. In one embodiment of the invention, extracting the crude titanium-aluminum-vanadium product from the mixture of titanium-bearing ore and vanadium bearing ore includes a thermal extraction reaction. For example, in one embodiment, the mixture of titanium-bearing ore and vanadium bearing ore is subject to thermal extraction to produce the crude titanium-aluminum-vanadium product. In some embodiments, the mixture of titanium-bearing ore and vanadium bearing ore is mixed with other components and agents to create a chemical blend that is then subjected to the thermal extraction. For example, the titanium-bearing ore may be mixed with one or more other components, such as reducing agents and viscosity agents, to create the chemical blend subjected to thermal extraction in the present invention.

In one embodiment, the chemical blend includes a reducing agent. Aluminum (Al), magnesium (Mg), sodium (Na), calcium (Ca) and carbon (C) are the common reducing agents. However, aluminum is the only viable reducing agent in the present invention in circumstances where the final titanium alloy is required to contain a significant amount of aluminum, such as, for example, 6.0% Al by weight in the Ti-6Al-4V alloy.

In one embodiment, the amount of other components needed for the chemical blend corresponds to the composition of the titanium and vanadium bearing ore mixture. For example, the amount of other components would correspond to the $TiO_2$ and $V_2O_5$ components in the ore mixture according to the following equation;

$$3(TiO_2+xV_2O_5)+(4+y)Al+zCaF_2 \rightarrow Ti_3Al_yV_{6x}O_{15x}+2Al_2O_3+zCaF_2$$

Where: $0.04<x<0.08$ and $0.3<y<1.2$ and $2.0<z<3.0$.
In another embodiment, $0.07<x<0.08$ and $0.6<y<1.1$.
In another embodiment, $x=0.06$ and $y=0.9$.

In one embodiment, the chemical blend includes a mixture of titanium oxide ($TiO_2$) bearing ore and vanadium oxide ($V_2O_5$) bearing ore and an aluminum (Al) reducing agent and the weight ratio of ($TiO_2+V_2O_5$):Al in the chemical blend is from 1.7 to 2.2. In others of these embodiments, the weight ratio of ($TiO_2+V_2O_5$):Al in the chemical blend is from 2.1 to 2.3. In yet others of these embodiments, the weight ratio of ($TiO_2+V_2O_5$):Al in the chemical blend is from 2.0 to 2.2.

In one embodiment, the chemical blend includes a mixture of $TiO_2$ bearing ore and $V_2O_5$ bearing ore, wherein the $TiO_2$:$V_2O_5$ weight ratio is from 5.5 to 8.0.

In another embodiment, the chemical blend includes one or more viscosity agents to achieve a desired slag viscosity. Adjusting the slag viscosity allows efficient separation of the metal alloy from the metal-bearing ore, and produces a slag that can be removed from the metal alloy after solidification and cooling has occurred. In one embodiment, viscosity agents are chosen that only affect the viscosity of the chemical blend and resulting slag, and affect the heat of the chemical blend only to a limited extent. Calcium fluoride ($CaF_2$) is one example of such a viscosity agent. $CaF_2$ does not take part in the chemical reaction between the mixture of titanium-bearing ore and vanadium bearing ore, and the reducing agent, and only aids in controlling the viscosity of the melt. Moreover, the melting point (1418° C.) and boiling point (2533° C.) of $CaF_2$ make it a good choice as a viscosity agent. In general, components that do not take part in the reaction and aid in controlling the viscosity of the slag are potential candidates. In some embodiments, various alkali halides, alkali-earth halides, and some oxides may be used as viscosity agents.

In one embodiment, the slag viscosity can be adjusted by varying the weight ratio of titanium oxide and vanadium oxide to $CaF_2$. In one embodiment, the weight ratio of $TiO_2$ and $V_2O_5$ to $CaF_2$ is from 1.3 to 1.5.

According to embodiments of the present invention, the extraction operation is externally heated. The heat generated by the mixture of titanium-bearing ore and vanadium bearing ore and the reducing agent in the chemical blend may not be sufficient to drive the extraction reaction by itself. That is, in order to drive the extraction reaction, the chemical blend must reach a temperature of at least 1610° C. to melt the crude titanium-aluminum-vanadium product in the chemical blend and sustain that temperature for a minimum period of time of 5 minutes.

In one embodiment of the invention, the extraction operation is carried out using an external heat source. For example, in one embodiment, the extracting operation uses an external induction furnace to heat the chemical blend. In other embodiments, the chemical blend is heated with other external heat sources, such as a resistive heating element furnace or an induction furnace. An externally heated extraction reaction is advantageous relative to an internal, self-heating reaction as it provides the ability to control the chemical reaction. In general, in an externally heated extraction reaction, the external heat initiates the extraction process at a temperature between 1500° C. and 1600° C. during the induction furnace temperature ramp up. Externally heated extraction reactions heat the entire reaction vessel, and allow the chemical blend to mix evenly and thoroughly, allowing the resulting crude titanium-aluminum-vanadium product and slag to separate well.

In one embodiment, the chemical blend does not need additional heat generating components to provide supplementary internal heat when it is externally heated. Accordingly, the chemistry of the resulting slag is less complex, allowing for a more straightforward recycling or disposal of the slag. In addition, when the components of the chemical blend are selected to be stable at room temperature to prevent spontaneous ignition, the external heat source can be used to initiate, as well as sustain and control, the extraction reaction without the use of ignition components.

An externally heated extraction reaction is not dependent on the chemical blend to generate heat. Instead, the external heat source provides the necessary heat that controls the extraction reaction. In addition, when using external heat generators, the heat is more evenly distributed throughout the blend as opposed to starting in a small, localized area and spreading through the rest of the chemical blend as is the case when using ignition components. Externally heated extraction reactions allow the reaction products (i.e., metal and slag) to separate more efficiently. Additionally, the reaction temperature can be controlled better to provide only enough heat to drive the extraction reaction and avoid reaction of the crude titanium-aluminum-vanadium product with the slag or reaction vessel. For example, in one embodiment, the chemical blend is placed within the induction furnace and the induction furnace is set to ramp up at a rate of 10° C./min. In other embodiments, the ramp up rate is between 5° C. to 15° C./min. In other embodiments, the ramp up rate is between 50° C. and 125° C./min; when the temperature of the chemical blend reaches between 1500 and 1600° C., the extraction reaction is initiated. However, at this temperature range, the extraction process will not be completed, in certain embodiments. As the induction furnace ramps up toward a final temperature of 1725° C., the extraction reaction continues, and enough heat is generated during this phase of the heating profile to separate the crude titanium-aluminum-vanadium product from the slag. Because both the crude titanium-aluminum-vanadium product and slag are molten at this temperature, the slag, having a lower density, rises and "floats" above the molten titanium product. In one embodiment, the temperature is maintained at 1725° C. for between 10 and 30 minutes from the initiation of the extraction reaction. In some embodiments, the final temperature is between 1750° C. and 1800° C. and the reaction time is between 10 and 20 minutes. In other embodiments, the final temperature is between 1700° C. and 1725° C. and the reaction time is between 12 and 18 minutes. In some embodiments, the reaction time range separates the crude titanium-aluminum-vanadium product from the slag and produces crude titanium-aluminum-vanadium product yields of between 85% and 95% based on the total amount of titanium and vanadium in the mixture of titanium and vanadium bearing ore concentrate. If the final temperature is maintained for less than 5 minutes, or if the final temperature is less than 1625° C., the extraction reaction may have less pronounced crude titanium-aluminum-vanadium product/slag separation leading to lower crude titanium-aluminum-vanadium product yields. If the final temperature is above 1800° C., or if the final temperature is maintained for more than 30 minutes, the extraction reaction may produce crude titanium-aluminum-vanadium product with higher levels of contamination as the molten titanium-aluminum-vanadium reacts with the reaction vessel walls and the slag.

The ability to adjust the reaction temperature by an external heat source, and controlling the duration of the period at the final temperature, allows more flexibility when selecting chemical ratios for the extraction reaction and the type of chemical components used. This flexibility enables the efficient incorporation of a wide range of raw ores into the process and improves the overall efficiency of the production process.

The present invention is economically advantageous compared to previous methods. As of today, the average cost of unalloyed titanium sponge is $9.00 per kg and Ti-6Al-4V is $17.00 per kg. It is estimated that the current invention will be able to produce Ti-6Al-4V for $7-8.00 per kg, even less than unalloyed titanium.

Additionally, the present invention stays away from traditional aluminothermic reduction, as used in previous methods, by eliminating the use of booster/accelerants and additional heat generating components. These components add an extra cost to the process and are unsafe to handle.

Embodiments of the present invention use titanium and vanadium oxide bearing ores directly for production of Ti-6Al-4V, and do not rely upon mixture of chlorides of titanium, vanadium and aluminum as precursor materials, as used in previous methods.

Embodiments of the present invention can be used to successfully produce Ti—Al—V alloys directly, without the need for post-process melting/alloying. In general, existing literature teaches away from using aluminothermic and electrochemical methods to produce Ti—Al—V alloys directly. Moreover, fundamental thermodynamic and electrochemical theory teaches away from using these methods.

Direct reduction of oxides has not been used to produce metal alloys other than binary alloys such as Ti—Al, V—Al, V—Cr, etc. Due to differences in exothermicity of the reactions, it is not possible to predict the outcome of the reaction when there is more than one oxide component present. For example, consider the following equations and reaction enthalpies:

$V_2O_5 + 10/3 Al = 2V + 5/3 Al_2O_3$; $\Delta H_{rxn}° = -915.6\ kJ$ $TiO_2 + 4/3 Al = Ti + 2/3 Al_2O_3$; $\Delta H_{rxn}° = -218.9\ kJ$ Insufficient exothermicity of the $TiO_2$—Al reaction leads to partially reduced $Ti_xO_y$—Al inclusions in V matrix. Therefore, a second refinement method is necessary to obtain Ti—V—Al alloy and so far no commercial method has been demonstrated. Electrochemical methods are not the obvious choice for the refining process since it is not possible to co-oxidize or co-reduce Ti, V and Al. In order to co-oxidize or co-reduce, the redox potentials of these elements need to be very close. However, Al and V oxidation—reduction potentials ($Al^{3+}/Al=-1.74$ V and $V^{3+}/V=-1.22V$) are not close enough to co-oxidize or co-reduce Al and V with Ti ($Ti^{2+}/Ti=-1.82V$).

Embodiments of the present invention address these and other issues, and can be used to successfully produce Ti—Al—V alloys directly, without the need for post-process melting/alloying.

EXAMPLE 1

In one example of the present invention, a crude titanium-aluminum-vanadium product was extracted from titanium- and vanadium-bearing ores as follows. Titanium-oxide and vanadium-oxide ore concentrates were ground in a ball mill to pass through a 200 mesh standard sieve (<74 μm). A chemical blend was prepared by blending 403.3 g of the prepared, ground titanium-oxide ore concentrate, 222.0 g of aluminum powder, 44.5 g of vanadium-oxide ore concentrate and 328.6 g of calcium fluoride in a jar mill for 30 to 45 minutes to achieve a uniform chemical blend. The chemical blend was then charged into a cylindrical graphite reaction vessel (3.63" d×5.5" h). The graphite reaction vessel containing the chemical blend was then placed into a graphite susceptor crucible (4.25" d×4.75" h) within the five turn copper induction coil of a 10 KHz, 50 KW Ajax-Tocco induction generator and placed into the containment housing. The containment housing was closed and purged with argon gas to displace oxygen from the system. The inert gas stream was then set to a flow rate of 50 standard cubic feet per hour (SCFH) and maintained throughout the remainder of the extraction operation. The induction generator was then activated to heat the chemical blend to ~1725° C. at a ramp up rate of 10° C./min and held at that temperature for about 10 minutes. The induction furnace was rapidly cooled down to 1575° C. and then allowed to cool to room temperature. The reaction products were removed and prepared for analysis. See Table 1 herein for chemical composition.

In embodiments of the present invention, it is critical to produce an unrefined, extracted metal having the correct chemistry to feed into the refining portion of the process to achieve the desired, final alloy composition. Blend ratios, reaction temperatures and times must be adjusted accordingly. For example, the chemical composition ranges for crude, extracted metal before refining listed in Table 1, are targeted to produce a Ti64 alloy. Other Ti—Al—V containing alloys can be produced by adjusting the chemistry and conditions of the current invention as well.

In one embodiment of the present invention, the crude titanium-aluminum-vanadium product extracted in the thermal process may be further refined to achieve a desired composition of the titanium-aluminum-vanadium alloy. For example, the crude titanium-aluminum-vanadium product extracted in the thermal process may be further refined to achieve the composition of Ti-6Al-4V.

In one embodiment of the present invention, refining of the crude titanium-aluminum-vanadium product is done via electrochemical refining. For example, in one embodiment, the crude product obtained through the extraction operation is placed in a reaction vessel having a cathode and an anode. An electrolyte capable of transporting titanium, aluminum and vanadium ions is placed in the reaction vessel and heated to subject the crude titanium-aluminum-vanadium product to an electro-refining process. In one embodiment of the present invention, the refining operation is done under an inert atmosphere.

In one embodiment of the invention, the anode consists of a non-consumable mesh-container. In another embodiment, the distance between the anode and the cathode is adjustable during the refining operation. Adjusting the distance between the cathode and anode prevents the anode-cathode from shorting-out as titanium-aluminum-vanadium alloy is deposited on the cathode and allows the maintenance of an optimum distance between the cathode and the anode throughout the refining operation. The electrolyte used during the refining operation may include halide salts of alkali metals or alkali-earth metals or a combination of both to produce a chemical melt in the range of 600° C. to 900° C. If the temperature of the chemical melt is above 900° C., the evaporation rate of the electrolyte may be too high.

In one embodiment of the invention, a resistive element furnace or an induction furnace can be used to heat the electrolyte. In another embodiment, the external heat source used in thermal extraction operation may be used to heat the electrolyte in refining operation.

The refining operation of the invention is environmentally safe and low-cost. It does not use hazardous chemicals such as chlorides of titanium, vanadium and aluminum or produce greenhouse gases, such as $CO_2$.

After the refining operation, the resulting refined titanium-aluminum-vanadium alloy product can be further processed into a final product. For example, the resulting refined titanium-aluminum-vanadium alloy can be ground or milled into Ti—Al—V powder.

Figure 2:
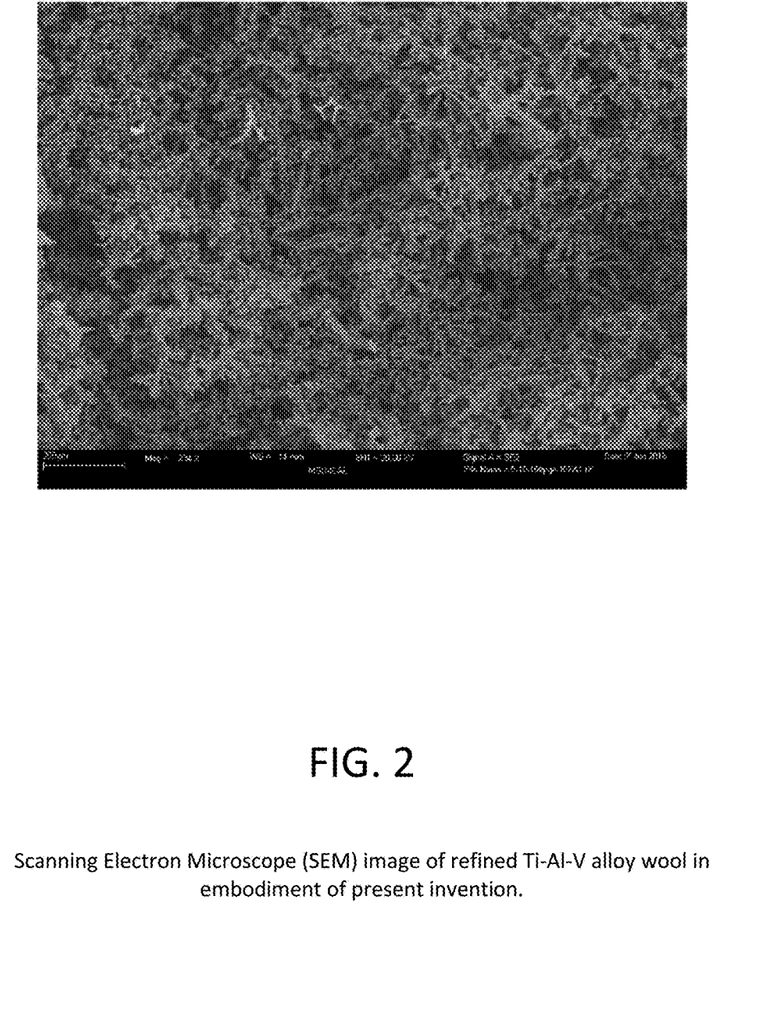
FIG. 2 illustrates a Scanning Electron Microscope (SEM) image of refined Ti—Al—V alloy wool according to an embodiment of the present invention.

According to one embodiment of the present invention, the refining operation produces a refined titanium-aluminum-vanadium alloy product with a fibrous, wool-like morphology (see FIG. 2). For example, the titanium-aluminum-vanadium alloy product may comprise titanium-aluminum-vanadium wool that has deposited on the cathode during the electro-refining operation. The wool structure of the titanium-aluminum-vanadium alloy uniquely provides a pathway for near-net shaped parts through hydraulic compression and subsequent sintering without the aid of a binding agent.

Due to the small size and delicate nature of the refined titanium-aluminum-vanadium product, near-net-shaped products can be compressed for further processing. For example, in one embodiment, the fibrous form of the refined titanium-aluminum-vanadium alloy product (titanium-aluminum-vanadium alloy wool) can be compressed by using hydraulic pressure. To accomplish this, the titanium-aluminum-vanadium alloy wool is placed into a compression mold of desired shape. The mold is then placed into a hydraulic press where, between 35 to 65 tons/in$^2$ is applied. This procedure can produce near-net shaped titanium-aluminum-vanadium alloy parts that can then be sintered, used as consumable electrodes in a vacuum arc remelt (VAR) process, melted or further processed depending on the product application.

In one embodiment, a refining apparatus may include a reaction vessel, a cathode, and an anode. The anode may be embodied as a perforated basket/container made from quartz or more noble metals than titanium (e.g., nickel or iron) to hold the crude titanium-aluminum-vanadium product garnered from the extraction operation. The reaction vessel holds the cathode, the anode, and an electrolyte which are used to subject the crude titanium-aluminum-vanadium product to an electro-refining process. In another embodiment, a refining apparatus may include a reaction vessel, a cathode, and an anode. The anode is a movable perforated basket/container made from nickel, iron or metals more noble than titanium, aluminum and vanadium to hold the crude titanium-aluminum-vanadium product garnered from the thermal extraction operation. The reaction vessel holds the cathode in the bottom, the anode suspended above the cathode, and an electrolyte which are used to subject the titanium product to an electro-refining process. Having the ability to adjust the distance between the cathode and the anode prevents the anode-cathode from shorting-out as titanium-aluminum-vanadium alloy is deposited on the cathode and thickness of wool grows, allowing the maintenance of an optimum distance between the cathode and the anode throughout the refining operation. For example, in one embodiment, the cathode to anode distance is between 2 cm and 4 cm.

In an embodiment, an electrolyte used during the refining operation may include halide salts of alkali metals or alkali-earth metals or a combination of both to produce a melt in the range of 600° C. to 900° C. A resistive element furnace can be used to heat the electrolyte. The crude titanium-aluminum-vanadium products from the extraction operation to be refined are placed into a perforated basket and used as the anode in the electronic circuit by connecting a lead to the positive (+) side of an electric power supply. In one embodiment, metal foil can be placed around the inside of the reaction vessel and used as the cathode by connecting it to the negative (−) side of the electric power supply. In one embodiment, during operation, the crude titanium-aluminum-vanadium product is oxidized (ionized) and titanium, aluminum and vanadium ions migrate to the cathode where they are reduced to form titanium-aluminum-vanadium alloy wool layer to make the refined titanium-aluminum-vanadium alloy product. In some embodiments, impurities are concentrated (left behind) in the anode basket or remain in the molten electrolyte.

Alternatively, in another embodiment, a cathode in the form of a metal plate can be placed parallel to the bottom of the reaction vessel with the anode basket suspended above the plate. In this configuration, the optimum distance between the cathode plate and the anode basket can be maintained by moving the anode basket vertically throughout the refining operation. The cathode is connected to the negative (−) side of the power supply by the lead and the anode is connected to the positive (+) side of the power supply. In one embodiment, the cathode to anode distance is between 2 cm and 4 cm. While the described embodiments of the electro-refining cell, the present invention is not limited thereto, and other configurations for the electro-purification cell are possible.

EXAMPLE 2

A crude titanium-aluminum-vanadium product obtained through a thermal extraction operation was refined through a refining operation as follows: 234 g of extracted Ti—Al—V product was placed inside a side perforated 500 ml nickel anode basket. The composition of the extracted product was 71% Ti, 16% Al, 8% V and 5O. The anode basket with extracted Ti—Al—V product pieces was then suspended above the cathode in the center of the reaction vessel made from quartz (volume—8000 ml) filled with 7500 g of an alkali halide salt blend of sodium chloride (NaCl) and Potassium Chloride (KCl) at a 44:56 NaCl:KCl weight percent ratio. A circular cathode was placed parallel to the bottom of reaction vessel, underneath the anode basket. The distance between cathode and anode basket was 3.0 cm. The cathode was made from molybdenum. The mixture of alkali halide salts was blended to produce a molten salt electrolyte at a temperature of approximately 650° C. The refining apparatus was placed into the containment housing and the electrodes were connected to the power supply. The containment housing was purged with argon gas and heated to about 850° C.

Electro-refining was carried out by using an applied DC current of 6.0 amps at a temperature of 750° C. while maintaining a potential difference of 0.8-1.3 volts. In some embodiments, the refining process is carried out at a temperature 100° C. higher than the melting point of the salt blend to ensure a complete melt and to avoid changes in the melting point due to salt loss from evaporation. In other embodiments, the potential differential is between 0.5 and 2.5 volts or between 1.0 and 1.8 volts. After 40 hours, the refining vessel was cooled to room temperature. The average cathode current density calculated was 0.03 A/cm². In other embodiments, the current density is between 0.01 A/cm² and 1.0 A/cm² or between 0.02 A/cm² and 0.05 A/cm². The frozen electrolyte salt was removed from the refined titanium product by washing with deionized water. Example 2 produced 103.0g of refined titanium-aluminum-vanadium alloy (titanium-aluminum-vanadium wool). The final product was then dried and prepared for analysis and further processing.

Table 1 summarizes the composition results of various titanium-aluminum-vanadium alloy products obtained from extraction operation before and after the refining operation. As illustrated in Table 1 herein, elemental composition of titanium, aluminum and vanadium is altered during the refining operation of thermally extracted crude titanium-aluminum-vanadium products obtained from mixture of titanium-bearing ore concentrates having $TiO_2$ and vanadium bearing ore concentrate having $V_2O_5$. The yield of the wool after refining operation was between 65.0%-85.0%.

TABLE 1

| | Composition of titanium-aluminum-vanadium product (wt %) | |
|---|---|---|
| Element | Before refining operation (crude) | After refining operation (refined) |
| Ti | 66.0-76.0 | 85.0-92.0 |
| Al | 11.0-21.0 | 5.0-10.0 |
| V | 6.0-10.0 | 3.0-5.0 |
| O | 3.0-7.0 | 0.2-0.6 |

Data from Table 1 indicates that, in some embodiments, titanium products obtained from the refining operation can be used as the base metal for producing Ti-6Al-4V powder or ingots. It is essential that the crude, extracted titanium-aluminum-vanadium product contains a significant amount of oxygen (for example; at least 3.0% by weight) in order to obtain a refined Ti—Al—V wool with at least 3.0% vanadium by weight. Lack of a significant amount of oxygen in the crude Ti—Al—V product will eliminate vanadium during the refining process. This is demonstrated in example 3.

EXAMPLE 3

225.0 g of commercial Ti-6Al-4V pieces (analysis; 6.0% Al, 4.0% V, 0.2% O and the rest was Ti by weight) were refined according to the experimental conditions described in example 2. After 40.0 hrs of electrolysis at 6.0 A, 142.0 g of wool collected for analysis. Analysis showed the composition was 3.2% Al, 1.0% V, 0.38% O and 95.3% Ti.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

The invention claimed is:

1. A method, comprising:
    (a) heating a chemical blend, wherein the chemical blend includes:
        an ore mixture of a titanium-bearing ore and an additional ore;
        an Al reducing agent, configured to reduce the ore mixture to a crude titanium alloy product; and
        a viscosity agent;
    (b) initiating an extraction reaction in the chemical blend to form: (1) the crude titanium alloy product wherein the extracted crude titanium alloy product includes at least 3.0 wt % oxygen, and (2) a residual slag; and
    (c) separating the residual slag from the crude titanium alloy product, wherein via the chemical blend ratio, the viscosity agent adjusts the slag viscosity to allow for efficient separation of the crude titanium alloy product from the residual slag into two layers during the reaction to produce a thermally extracted crude titanium alloy product;
    (d) configuring the thermally extracted crude titanium alloy product as an anode in an electrolytic cell, wherein the electrolytic cell is configured with an electrolyte;
    (e) heating the electrolyte to a temperature between 600° C. and 900° C. to provide a molten electrolyte, wherein the molten electrolyte is retained in a reaction vessel and is in contact with the anode and a cathode;
        i. directing a current from the anode, through the molten electrolyte bath to the cathode;
        ii. depositing a refined titanium alloy product on the cathode; and
        iii. recovering the refined titanium alloy product from the reaction vessel, wherein the refined titanium alloy product includes at least 85 wt. % titanium and 5.0 wt. % aluminum and metal from the additional ore,
    wherein the titanium-bearing ore includes titanium oxide, the additional ore includes vanadium oxide, the reducing agent includes aluminum, and the viscosity agent includes calcium fluoride,
        further wherein the ratio of titanium-bearing ore to vanadium-bearing ore to reducing agent to viscosity agent corresponds to the following equation:

$$3(TiO_2+xV_2O_5)+(4+y)Al+zCaF_2 \rightarrow Ti_3A_yV_{6x}O_{15x}+2Al_2O_3+zCaF_2,$$

where: $0.07<x<0.08$ and $0.3<y<1.2$ and $2.0<z<3.0$.

2. The method of claim 1, wherein the additional ore is a vanadium bearing ore.

3. The method of claim 1, wherein the chemical blend includes a ratio of the titanium and vanadium bearing ore mixture to the reducing agent that corresponds to a weight ratio of titanium oxide and vanadium oxide components in the ore mixture to reducing metal in the reducing agent of 1.7 to 2.3.

4. The method of claim 1, wherein the heating step further includes: heating the chemical blend at a ramp up rate between 1° C. to 125° C/min.

5. The method of claim 1, wherein the heating step further includes: heating the chemical blend to a temperature between 1500-1800° C.

6. The method of claim 5, wherein the heating step further includes: externally heating the chemical blend to maintain the chemical blend at a reaction temperature between 1600-1800° C. for a time period between 5 and 30 minutes.

7. The method of claim 1, method further includes, after the reacting step, cooling the crude alloy product and residual slag to a temperature between 1500° C. and 1600° C.

8. The method of claim 1, wherein 0.04<x<0.08 and 0.4<y<1.1.

9. The method of claim 1, wherein x=0.06 and y=1.0.

10. The method of claim 1, wherein the ore mixture includes titanium oxide and vanadium oxide, wherein the weight ratio of the titanium oxide to the vanadium oxide component in the ore mixture corresponds to a ratio of 5.5 to 11.

11. The method of claim 1, further comprising a viscosity agent, wherein the viscosity agent includes calcium fluoride and the additional ore is a vanadium bearing ore;
wherein the ratio of the titanium and vanadium bearing ore mixture to the viscosity agent $CaF_2$ that corresponds to a weight ratio of titanium oxide and vanadium oxide components in the ore mixture to viscosity agent $CaF_2$ of 1.1 to 1.8.

12. The method of claim 1, wherein the thermally extracted titanium-crude alloy product includes at least 66.0% titanium, 11.0% aluminum, 6.0% vanadium and 3.0% oxygen by weight.

13. The method of claim 1, wherein the thermally extracted crude titanium alloy product yield is between 85.0%-95.0%.

14. The method of claim 1, wherein the refined titanium alloy product is fibrous.

15. The method of claim 1, wherein the refined titanium alloy product has a wool-like morphology.

16. The method of claim 1, further comprising compacting the refined titanium alloy product into a near net shaped green compact without a binding agent.

17. The method of claim 1, wherein the refined titanium alloy product includes titanium-aluminum-vanadium metal alloy wool.

18. The method of claim 1, wherein the refined titanium alloy product includes at least 88.0% titanium, 5.0% aluminum, and 3.0 wt. % vanadium by weight.

19. The method of claim 1, further comprising grinding and/or spheroidizing the refined titanium alloy product into a powder.

20. The method of claim 1, wherein the refined titanium alloy product includes at least 90 wt. % titanium and 5.5 wt % aluminum and 3.5 wt % vanadium.

21. The method of claim 1, wherein the ore mixture has a particle size between 50 microns and 200 microns.

22. The method of claim 1, wherein the ore mixture has a particle size less than 80 microns.

23. The method of claim 1, wherein the ore mixture comprises appropriate quantities of aluminum, iron, chromium, copper, manganese, silicon, zirconium, molybdenum, silver, vanadium, nickel, cobalt, tin, or rare-earth ores to produce the refined titanium alloy product.

24. The method of claim 1, wherein the voltage differential between the anode and cathode is between 0.5 volts and 2.5 volts.

25. The method of claim 1, wherein the cathode current density is between 0.01 A/cm$^2$ and 1.0 A/cm$^2$.

26. The method of claim 1, wherein the heating step further includes: heating the chemical blend at a ramp up rate between 1° C. to 10 ° C/min.

27. The method of claim 1, further wherein the electrolyte consists essentially of:
halide salts of alkali metals;
halide salts of alkali earth metals; or
a combination of halide salts of alkali metals and halide salts of alkali earth metals.

28. A method, comprising:
(a) heating a chemical blend to a temperature of between 1500° C-1800° C. wherein the chemical blend includes:
an ore mixture of titanium-bearing ore comprising titanium oxide and vanadium bearing ore comprising vanadium oxide;
an Al reducing agent, configured to reduce the titanium and vanadium bearing ore mixture; and
a $CaF_2$ viscosity agent;
wherein, the ratio of the titanium oxide and vanadium oxide components in the ore mixture to the reducing agent to viscosity agent corresponds to the following equation:

where: 0.04<x<0.08 and 0.3 <y<1.2 and 2.0<z<3.0
(b) Initiating an extraction reaction in the chemical blend to form: (a) a crude titanium-aluminum-vanadium product wherein the extracted product includes at least 66.0 wt. % titanium, 11.0 wt. % aluminum, 6.0 wt % vanadium and 3.0 wt % oxygen, and (b) a residual slag; and
(c) separating the residual slag from the crude titanium-aluminum-vanadium product, wherein via the chemical blend ratio, the $CaF_2$ viscosity agent adjusts the slag viscosity to allow for efficient separation of the crude titanium-aluminum-vanadium product from the residual slag into two layers during the reaction to produce a thermally extracted crude titanium aluminum-vanadium product;
(d) configuring the thermally extracted crude titanium aluminum-vanadium product as an anode in an electrolytic cell, wherein the electrolytic cell is configured with an electrolyte
(e) heating the electrolyte consisting of: halide salts of alkali metals, halide salts of alkali earth metals, and combinations thereof, to a temperature between 600° C. and 900° C. to provide a molten electrolyte, wherein the molten electrolyte is retained in a reaction vessel and is in contact with the anode and a cathode;
  i. directing a current from the anode, through the molten electrolyte bath to the cathode,
  ii. depositing a refined titanium-aluminum-vanadium alloy product on the cathode, and
  iii. recovering the refined titanium-aluminum-vanadium alloy product from the reaction vessel, wherein the refined titanium-aluminum-vanadium alloy includes at least 85.0 wt. % titanium, 5.0 wt % aluminum and 3.0 wt % vanadium.

29. The method of claim 28, wherein the method further comprises initiating, sustaining and controlling the extraction reaction in the chemical blend.

30. The method of claim 28, wherein the chemical blend includes; a ratio of the titanium and vanadium bearing ore mixture to the reducing agent that corresponds to a weight ratio of titanium oxide and vanadium oxide components in the ore mixture to reducing metal in the reducing agent of 1.8 to 2.2.

31. The method of claim 28, wherein the chemical blend includes; a ratio of the titanium and vanadium bearing ore mixture to the reducing agent that corresponds to a weight ratio of titanium oxide and vanadium oxide components in the ore mixture to reducing metal in the reducing agent of 1.9 to 2.1.

32. The method of claim 28, wherein the heating step further includes: heating the chemical blend at a ramp up rate between 1° C. to 25° C/minute.

33. The method of claim 28, wherein the heating step further includes: heating the chemical blend at a ramp up rate between 26° C. to 50° C/minute.

34. The method of claim 28, wherein the heating step further includes: heating the chemical blend at a ramp up rate between 51° C. to 100° C/minute.

35. The method of claim 28, wherein the heating step further includes: heating the chemical blend at a ramp up rate between 101° C. to 125° C/minute.

36. The method of claim 28, wherein the heating step further includes: externally heating the chemical blend to maintain the chemical blend at a reaction temperature between 1600-1800° C. for a time period between 10 and 20 minutes.

37. The method of claim 28, wherein the heating step further includes: externally heating the chemical blend to maintain the chemical blend at a reaction temperature between 1600-1800° C. for a time period between 21 and 30 minutes.

38. The method of claim 28, wherein the method further includes, after the reacting step, cooling the crude titanium-aluminum-vanadium product and residual slag to a temperature between 1500° C. and 1600° C.

39. The method of claim 28, wherein the ore mixture includes titanium oxide and vanadium oxide, wherein the weight ratio of the titanium oxide to the vanadium oxide component in the ore mixture corresponds to a ratio of 6.0 to 9.0.

40. The method of claim 28, wherein the ratio of the titanium and vanadium bearing ore mixture to the viscosity agent $CaF_2$ that corresponds to a weight ratio of titanium oxide and vanadium oxide components in the ore mixture to viscosity agent $CaF_2$ of 1.2 to 1.6.

41. The method of claim 28, wherein the thermally extracted crude titanium-aluminum-vanadium product includes: between 66-76% titanium, 11-21% aluminum, 6-10% vanadium and 3-7% oxygen.

42. The method of claim 28, wherein the thermally extracted crude titanium-aluminum-vanadium product yield is between 85.0%-95.0%.

43. The method of claim 28, wherein the refined titanium-aluminum-vanadium metal alloy product is fibrous.

44. The method of claim 28, wherein the refined titanium-aluminum-vanadium metal alloy product has a wool-like morphology.

45. The method of claim 28, further comprising compacting the refined titanium-aluminum-vanadium metal alloy product into a near net shaped green compact without a binding agent.

46. The method of claim 28, wherein the refined titanium-aluminum-vanadium alloy product includes titanium-aluminum-vanadium metal alloy wool.

47. The method of claim 28, wherein the refined titanium-aluminum-vanadium alloy product includes 88-92 wt. % titanium, 5.0-7.0 wt. % aluminum, 3-5 wt. % vanadium.

48. The method of claim 28, further comprising grinding the refined titanium-aluminum-vanadium metal alloy product into a powder.

49. The method of claim 28, further comprising grinding and/or spheroidizing the refined titanium-aluminum-vanadium metal alloy product into a powder.

50. The method of claim 28, wherein the refined titanium alloy includes at least 88.0 wt. % titanium and 5.0 wt % aluminum and 3.0 wt % vanadium.

51. The method of claim 28, wherein the ore mixture has a particle size between 81 microns and 100 microns.

52. The method of claim 28, wherein the ore mixture has a particle size between 101 microns and 200 microns.

53. The method of claim 28, wherein the ore mixture has a particle size less than 80 microns.

54. The method of claim 28, wherein the ore mixture includes between 75-95% by weight oxide components.

55. The method of claim 28, wherein the ore mixture includes between 95-99% by weight oxide components.

56. The method of claim 28, wherein the voltage differential between the anode and cathode is between 0.7 volts and 1.4 volts.

57. The method of claim 28, wherein the voltage differential between the anode and cathode is between 1.5 volts and 2.0 volts.

58. The method of claim 28, wherein the voltage differential between the anode and cathode is between 2.1 volts and 3.0 volts.

59. The method of claim 28, wherein the cathode current density is between $0.01 A/cm^2$ and $0.06 A/cm^2$.

60. The method of claim 28, wherein the cathode current density is between $0.07 A/cm^2$ and $1.0 A/cm^2$.

61. A method, comprising:
(a) applying a thermal extraction process to a blend of titanium-bearing ore and vanadium-bearing ore, wherein the thermal extraction process includes:
heating a chemical blend to initiate an extraction reaction, wherein the chemical blend includes: a titanium-bearing ore, a vanadium bearing ore, and a reducing agent;
reacting the chemical blend to form: (1) a titanium-aluminum-vanadium product, and (2) a residual slag, wherein via the viscosity agent, the titanium-aluminum-anadium product is separated from the residual slag into two layers;
(b) refining the titanium-aluminum-vanadium product obtained from the thermal extraction process in an electrochemical separation process, wherein the electrochemical separation process includes:
i. heating an electrolyte consisting essentially of: halide salts of alkali metals, halide salts of alkali earth metals, or combinations thereof, to a temperature between 600° C. and 900° C. to provide a molten electrolyte, wherein the electrolyte is retained in a reaction vessel;
ii. applying an electrical differential between an anode and a cathode to deposit titanium on the cathode, wherein the anode and cathode are configured in the reaction vessel in contact with the electrolyte; and
iii. recovering a refined titanium-aluminum-vanadium product from the reaction vessel, wherein the refined titanium-aluminum-vanadium product includes at least 85 wt. % titanium and 5 wt % aluminum and 3 wt % vanadium, further wherein the refined titanium product is configured via (a) and (b) as a fibrous, wool-like morphology; and (c) compressing the refined titanium product in a mold to form a near-net shaped titanium part.

\* \* \* \* \*